(12) United States Patent  (10) Patent No.: US 7,545,361 B2
Erickson  (45) Date of Patent: Jun. 9, 2009

(54) AUTOMATICALLY SWITCHING INPUT AND DISPLAY DEVICES BETWEEN MULTIPLE WORKSTATIONS

(75) Inventor: Adam J. Erickson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 11/116,627

(22) Filed: Apr. 28, 2005

(65) Prior Publication Data

US 2006/0244724 A1   Nov. 2, 2006

(51) Int. Cl.
 *G09G 5/00* (2006.01)
(52) U.S. Cl. .................................. 345/156; 345/163
(58) Field of Classification Search ........ 345/156, 345/163, 168; 710/15, 62, 72–73
 See application file for complete search history.

(56) References Cited

U.S. PATENT DOCUMENTS

| 6,069,615 | A  | * | 5/2000  | Abraham et al. ........... 345/168 |
| 6,256,014 | B1 | * | 7/2001  | Thomas et al. ............. 345/163 |
| 6,469,690 | B1 | * | 10/2002 | Abraham et al. ........... 345/156 |
| 2002/0066031 | A1 | * | 5/2002 | Seki et al. .................... 713/201 |
| 2002/0105553 | A1 | * | 8/2002 | Segre .......................... 345/862 |
| 2003/0229731 | A1 | * | 12/2003 | Keller ......................... 710/15 |
| 2005/0066000 | A1 | * | 3/2005 | Liaw et al. ................. 709/204 |
| 2005/0275641 | A1 | * | 12/2005 | Franz ......................... 345/204 |

OTHER PUBLICATIONS http://synergy2.sourcforge.net/, "Synergy", p. 1, printed Feb. 3, 2000.
http://www.sixpencesoftware.com, "Sixpence Software", pp. 1-2, printed Feb. 3, 2000.

* cited by examiner

*Primary Examiner*—Chanh Nguyen
*Assistant Examiner*—Robert M Stone
(74) *Attorney, Agent, or Firm*—Martin & Associates, LLC

(57) ABSTRACT

Multiple computer workstations are connected to output ports of an automatic switching device having a controller switch. Input devices, such as a mouse and keyboard, are connected to an input port of the automatic switching device and multiple displays may be either connected directly to a corresponding workstation, or to the automatic switching device. Output signals of the input devices are routed to a selected output port of the automatic switching device. The controller switch automatically switches the output signals of the input devices between the output ports when a switch command signal is received from the selected port. The switch command signal is sent to the automatic switching device by a software agent in a workstation when the software agent detects that movement of a mouse meets a predetermined boundary condition, such as moving off the edge of a display.

6 Claims, 7 Drawing Sheets

AUTOMATICALLY SWITCHING INPUT AND DISPLAY DEVICES BETWEEN MULTIPLE WORKSTATIONS

BACKGROUND OF THE INVENTION

1. Technical Field

This invention generally relates to computer systems, and more specifically relates to an apparatus and method for switching input devices between multiple computer workstations.

2. Background Art

As technology keeps increasing and businesses become more integrated, a computer user may utilize two or three different workstations at a time to bring up the various applications that are needed for the job. For example, a workstation running the Linux operating system may be needed for a Linux application, and a workstation running the Windows XP operating system may be needed for a Windows application. One problem, though, with utilizing multiple workstations is finding the space needed for each workstations' devices, such as mice, keyboards, and displays.

In order to deal with the spacing issue of multiple workstations, a conventional keyboard, video and mouse (KVM) switching device may be used to switch input devices of the KVM between multiple workstations. As seen in FIG. 1, a conventional multiple workstation system 100 includes at least two workstations, workstation 120 and workstation 122, and a KVM switching device 130. KVM switching device 130 allows the replacement of multiple displays, keyboards, and mice normally associated with each workstation with a single display 124, keyboard 126 and mouse 128, which are connected to KVM switching device 130. KVM switching device 130 routes signals from the input devices (i.e., keyboard 126 and mouse 128) to one of workstations 120 and 122 through a manual switching action, such as a mechanical pushbutton 132. In a first state, KVM switching device 120 routes the signals from display 124, keyboard 126, and mouse 128 to workstation 120. When the pushbutton 132 is pressed, KVM switching device 130 changes to a second state, and routes the signals from display 124, keyboard 126, and mouse 128 to workstation 122. Thus, display 124, keyboard 126 and mouse 128 may be used with either workstation 120 or workstation 122, depending upon the state of KVM switching device 130 as determined by pushbutton 132.

Although this solution reduces the area needed to set up multiple workstations, a conventional KVM may only view the data of one workstation at a time since only one display is utilized. Critical information may be missed from one workstation when working with the other workstation. Furthermore, routing the signals of the input devices of the KVM through a manual means, such as a mechanical pushbutton, may be an inconvenience when one is involved in one's work.

FIG. 2 illustrates another prior art multiple workstation system 200 wherein signals from keyboard 126A and mouse 128A are switched between a workstation 220 and a workstation 240 through an ethernet switch 230. A display 222, keyboard 126A and mouse 128A are connected to workstation 220, and a display 242, keyboard 126B and mouse 128B are connected to workstation 240. Workstation 220 and workstation 240 are connected to ethernet switch 230 through ethernet cables 234 and 236, respectively. In this system 200, workstation 220 and workstation 240 are required to be on the network and thus are connected to internet 270 through ethernet switch 230, site LAN 250 and WAN/LAN Router 260. A server/client relationship is developed between workstation 220 (i.e., server workstation) and workstation 240 (i.e., client workstation) and keyboard 126A and mouse 128A of server workstation 220 may be used to operate both workstations in system 200 when connected to the network. Both mice, 128A and 128B, and keyboards, 126A and 126B, are necessary, though, to initially connect across the LAN to communicate with the other workstation.

Although data from both workstations may be viewed at the same time for system 200, the problem with the required area needed to set up the multiple workstations still exists since both keyboards and mice are necessary for system 200. Furthermore, since system 200 requires Ethernet switch 230, which is exposed to and used by the site LAN, speed, security and network access become an issue. That is, the network packets used to communicate between internet 270 and workstation 220 are slower than a hardwire connection; the security of workstation 220 and workstation 240 can be compromised when connected to site LAN 250 without a knowledge of setting up security; and either one or both of the workstations may not have access to, or are incompatible to an Ethernet connection.

Although signals of the input devices may be switched between multiple workstations in the prior art, the problems still exist of either manually switching input devices between multiple workstations and limiting viewing of the workstations' data, or jeopardizing security, accessibility and space of the multiple workstations. Without a way to solve these problems, multiple workstation users will continue to suffer from the inconvenience of using multiple sets of interface devices to productively access multiple workstations.

DISCLOSURE OF INVENTION

Multiple computer workstations are connected to output ports of an automatic switching device having a controller switch that changes state according to one or more switch commands received from one or more workstations. Input devices, such as a mouse and keyboard, are connected to an input port of the automatic switching device, and multiple displays may be either connected directly to a corresponding workstation, or to the automatic switching device. Output signals of the input devices are routed to a selected output port of the automatic switching device. The controller switch automatically switches the output signals of the input devices between the output ports when a switch command signal is received from one of the workstations. The switch command signal is sent to the automatic switching device from an agent program on the workstation when the movement of a mouse connected to the automatic switching device meets a predetermined boundary condition, such as moving off the edge of a display. This switch command signal is generated by an agent program and is routed to the automatic switching device, which switches control of the input devices to a different workstation that is also running an agent program that is capable of sending a similar switch command signal to the automatic switching device.

The foregoing and other features of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention provides an automatic switching device that automatically switches output signals from input devices connected to the automatic switching device between the output ports of the automatic switching device, to which multiple computer workstations are connected. The automatic switching device routes the output signals of the input devices to a selected workstation and switches the output signals to another workstation when a switch command signal is sent from one of the workstations. Multiple displays are also used to view the data of at least two workstations. The switch command signal is sent to automatic switching device from an agent program on the workstation when the movement of a mouse connected to the automatic switching device meets a predetermined boundary condition, such as moving off the edge of a first display.

Figure 1:
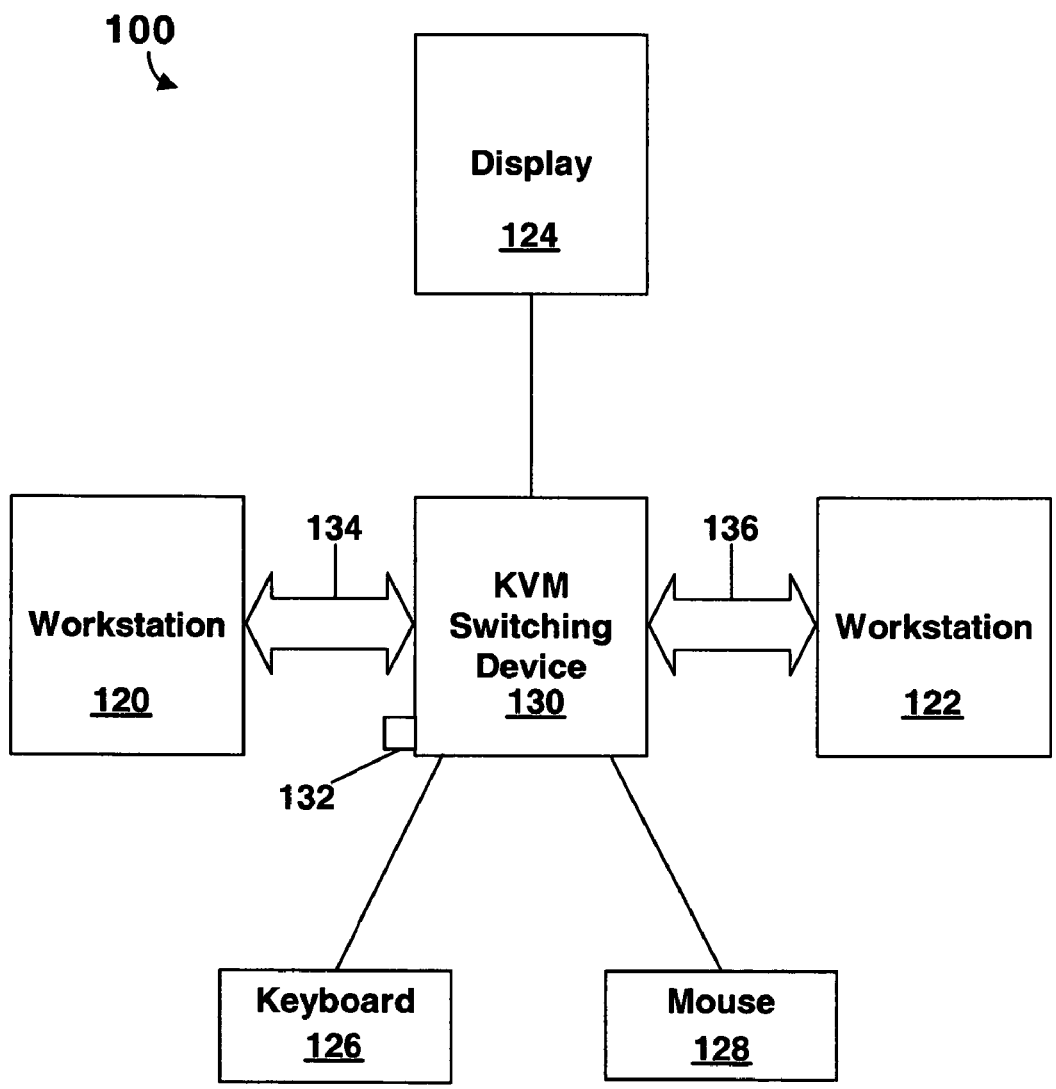
FIG. 1 is a block diagram of a first prior art multiple computer workstation system.
Figure 2:
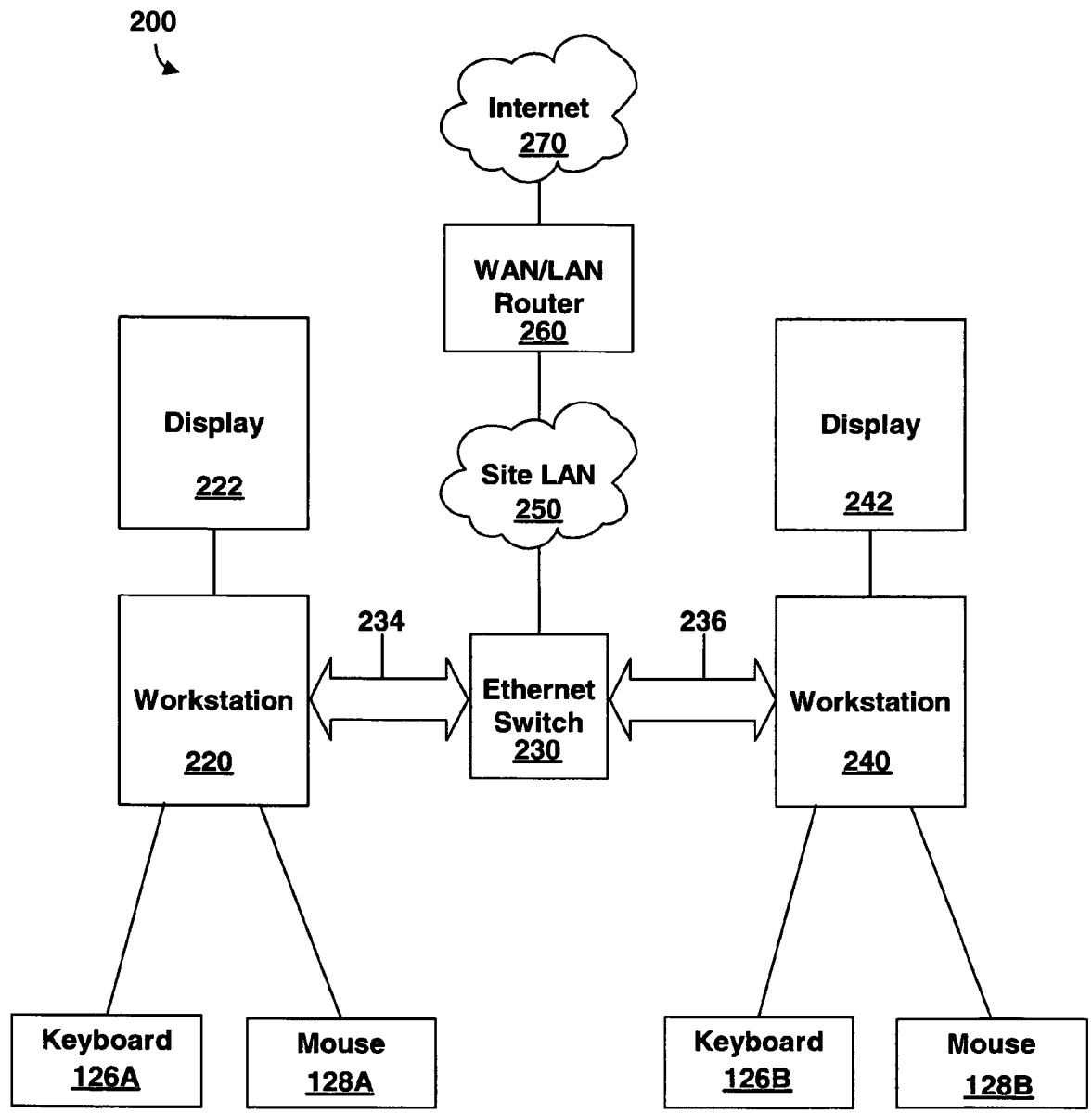
FIG. 2 is a block diagram of a second prior art multiple computer workstation system.
Figure 3:
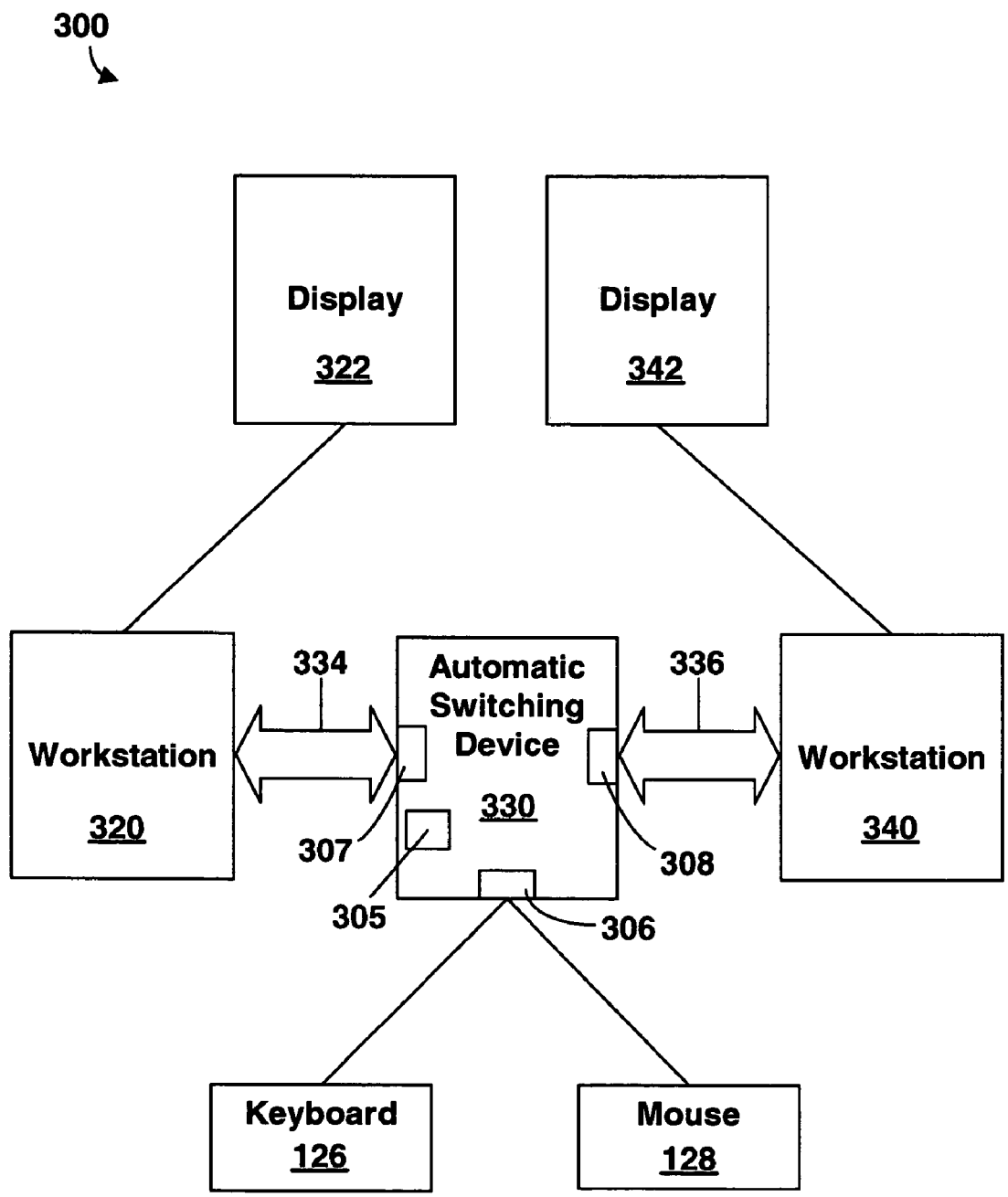
FIG. 3 is a block diagram of a multiple workstation system in accordance with the preferred embodiments.

Referring to FIG. 3, a multiple workstation computer system 300 in accordance with the preferred embodiments includes a workstation 320, a workstation 340 and an automatic switching device 330 having a controller switch 305, input port 306, output port 307, and output port 308. Input devices, such as a keyboard 126 and a mouse 128, are connected to automatic switching device 330 through input port 306. Although only keyboard 126 and mouse 128 are specifically shown in this example, it is to be understood that other devices, such as audio/video devices may also be connected to automatic switching device 330 and used in the present invention. Workstation 320 and workstation 340 are connected to automatic switching device 330 through communication lines 334 and 336, and output ports 307 and 308, respectively. Communication lines 334 and 336 are preferably hardwired to provide security between the workstations and automatic switching device 330. Communication lines 334 and 336 may consist of PS/2 cables, USB cables, or any other appropriate cables that will communicate with the ports of input devices on workstations 320 and 340, such as input ports for mouse 128 or keyboard 126. Two displays, 322 and 342, are connected to workstations 320 and 340, respectively. Display 322 provides viewing of data from workstation 320, and display 342 provides viewing of data from workstation 340, allowing data from both workstations to be visible at all times. In this example, the output signals on input port 306 are automatically switched to one of either output ports, 307 or 308, by controller switch 305 when the movement of mouse 128 meets a predetermined boundary condition. Example of a predetermined boundary condition include the movement of mouse 128 off the right edge of display 322 when output port 307, and thus workstation 320, is selected and the movement of mouse 128 off the left edge of display 342 when output port 308, and thus workstation 340, is selected. Controller switch 305 may include any suitable switching mechanisms, including relays, solid-state relays, transistors, or any other suitable means for switching the signals on input port 306 to output port 307 or output port 308. In addition, controller switch 305 may include a simple state machine, or may include a processor with programming that accomplishes the switching function described herein. Although two workstations 320 and 340 are specifically used in this example, it is to be understood that any suitable number of workstations may be used and connected to automatic switching device 330, as will be discussed in greater detail in reference to FIG. 7.

The preferred embodiments provide a significant improvement over the prior art, wherein the user had to manually switch the input devices between the workstations, and only one display of data from a single workstation would be shown at a time. Furthermore, the disadvantages of connecting to an Ethernet switch, which is exposed to the site LAN, also discussed in reference to the prior art, are resolved through the present invention. For example, because communication lines 334 and 336 are preferably hardwired, the connections between workstations are secure, knowledge of computer networking is not necessary, and clear text, unencrypted data (such as passwords) are not exposed on the site LAN.

Figure 4:
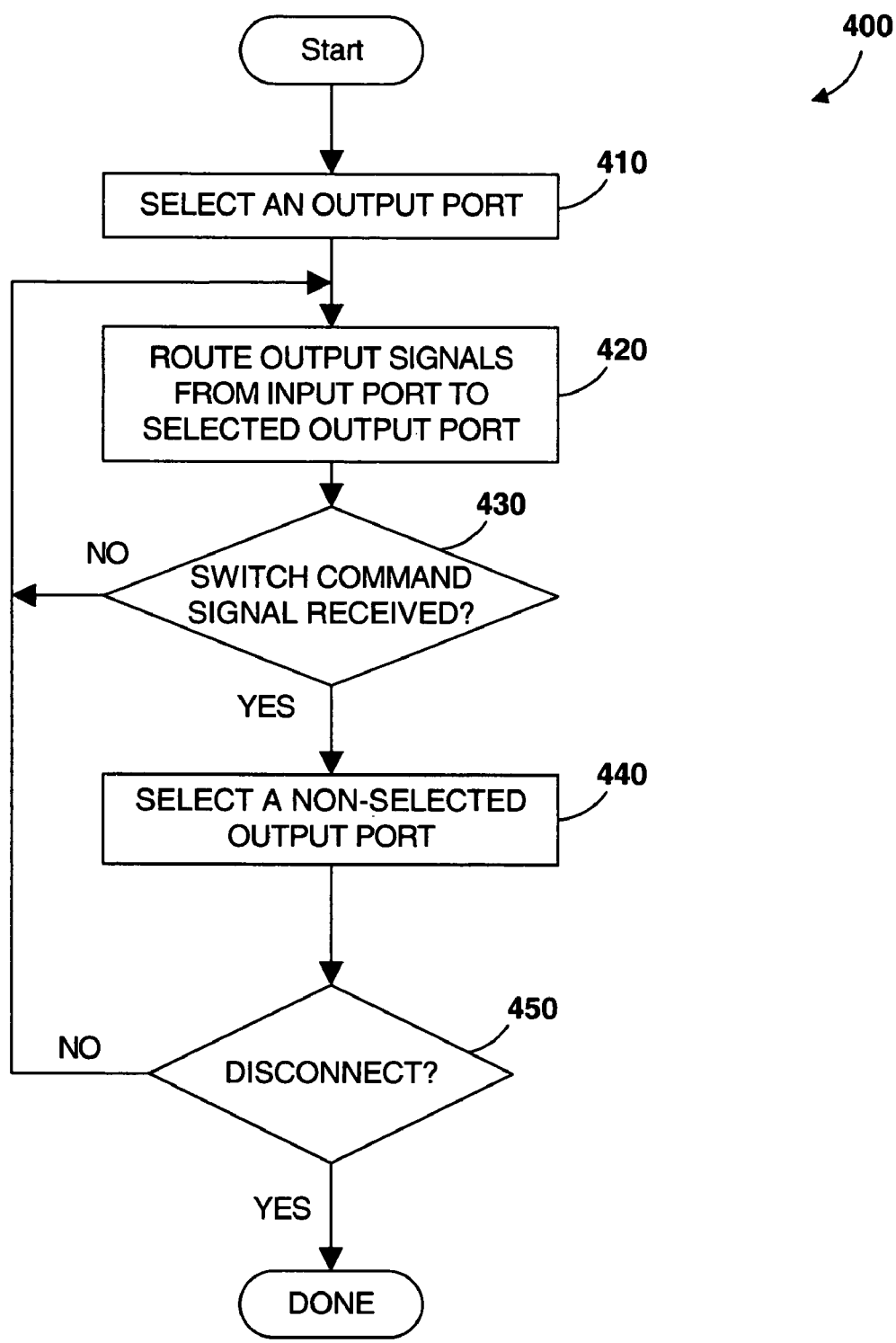
FIG. 4 is a flow diagram of a method in accordance with the preferred embodiments for the automatic switching device of FIG. 3.

Referring to FIG. 4, a method 400 in accordance with the preferred embodiments is a method for automatically routing output signals from an input port to an output port in an automatic switching device. Method 400 is preferably performed by automatic switching device 330 of FIG. 3. The first step is to select an output port (e.g., output port 307) (step 410). Output port 307 may be selected through controller switch 305 and may be a default when automatic switching device 330 is turned on. Output signals from input port 306 are then routed to the selected output port 307 with controller switch 305 (step 420). In this specific implementation, dummy signals are provided to the non-selected output port (i.e., output port 308) so keyboard 126 and mouse 128 appear inactive instead of appearing to be disconnected from workstation 340. Other suitable implementations may also be used. If a switch command signal is not received by controller switch 305 through selected output port 307 (step 430=NO), method 400 loops back to step 420.

If a switch command signal is received by controller switch 305 (step 430=YES), another non-selected output port (i.e., output port 308) is selected (step 440). As aforementioned, switching between output ports 307 and 308 may be done using any suitable technology, such as relays, solid-state relays, transistors, or any other suitable means for switching signals from an input port to a selected output port. If a disconnect (e.g., power being turned off to any of the workstations, or one or both of the workstations are disconnected from the automatic switching device) does not occur (step 450=NO), method 400 then loops back to step 420 wherein the output signals from input port 306 are now routed to output port 308 and dummy signals are provided to output port 307. Method 400 is done when a disconnect occurs (step 450=YES).

Figure 5:
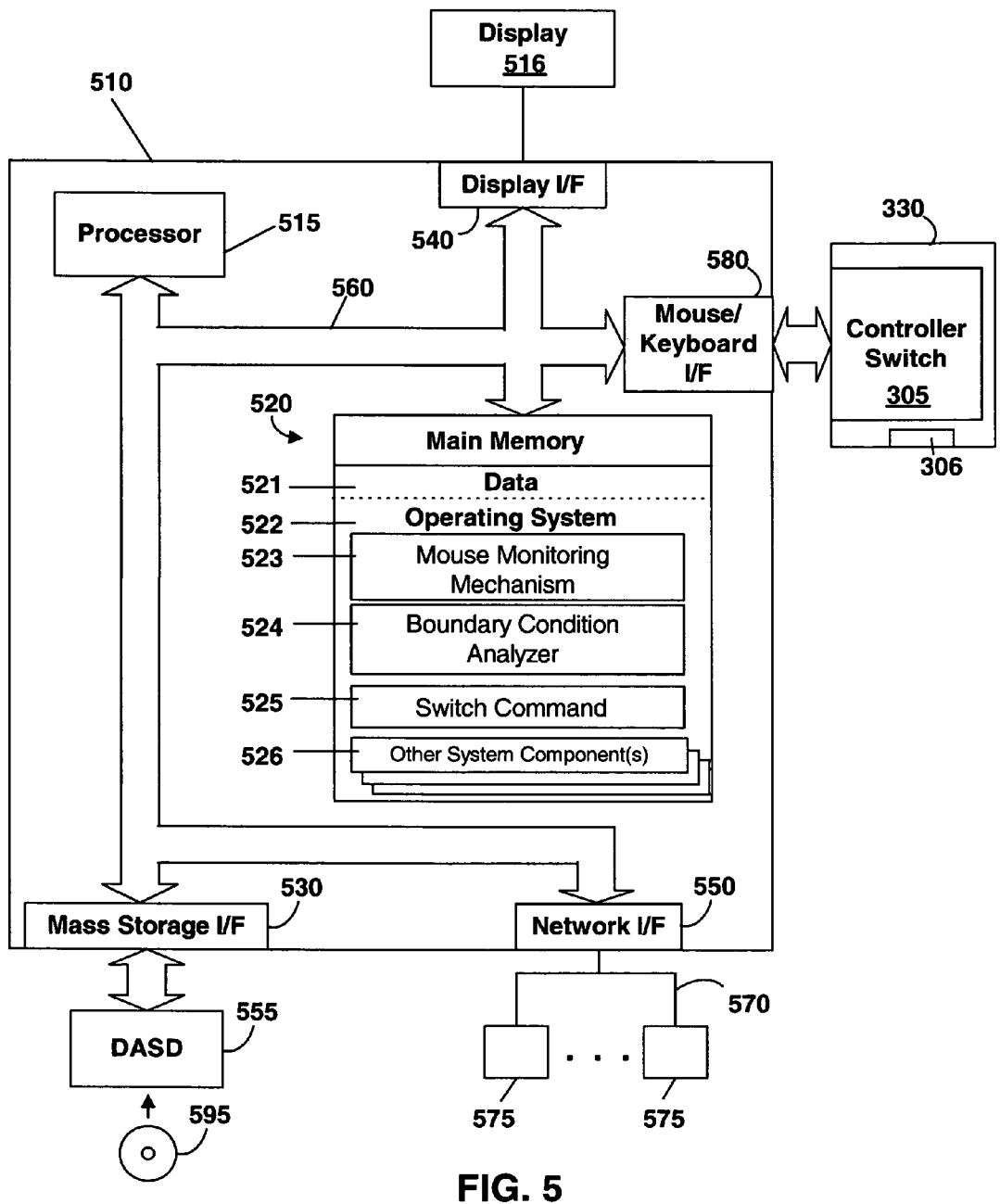
FIG. 5 is a block diagram of a workstation and automatic switching device of FIG. 3 in accordance with the preferred embodiments.

Referring to FIG. 5, a computer system 510 is one suitable implementation of each workstation (e.g., workstation 320 and workstation 340 of FIG. 3) connected to automatic switching device 330 in accordance with the preferred embodiments of the invention. Those skilled in the art will appreciate that the mechanisms and apparatus of the present invention apply equally to any manual input-driven (e.g., keyboard and mouse) computer system, regardless of whether the computer system is a complicated multi-user computing apparatus, a single user workstation, or an embedded control system. As shown in FIG. 5, computer system 510 comprises a processor 515, a main memory 520, a mass storage interface 530, a display interface 540, a mouse/keyboard interface 580, and a network interface 550. These system components are interconnected through the use of a system bus 560. Mass storage interface 530 is used to connect mass storage devices, such as a direct access storage device (DASD) 555, to computer system 510. One specific type of direct access storage device 555 is a readable and writable CD RW drive, which may store data to and read data from a CD RW 595.

Main memory 520 in accordance with the preferred embodiments contains data 521, an operating system 522, a mouse monitoring mechanism 523, a boundary condition analyzer 524, a switch command 525, and other system components 526. Data 521 represents any data that serves as input to or output from any program in computer system 510. Operating system 522 is a multitasking operating system, such as i5/OS, Windows XP, Linux, or Unix; however, those skilled in the art will appreciate that the spirit and scope of the present invention is not limited to any one operating system. Mouse monitoring mechanism 523 is agent software that provides a mechanism for monitoring the movements of mouse 128 (FIG. 3). Boundary condition analyzer 524 analyzes the movements of mouse 128 (FIG. 3) and indicates when predetermined boundary conditions have been met. Switch command 525 provides a switch command to controller switch 305 of automatic switching device 330 when boundary conditions of mouse 128 (FIG. 3) have been met, as indicated by the boundary condition analyzer 524. Controller switch 305 routes signals from input port 306 to an output port that is coupled to the input port (e.g., mouse/keyboard interface 580) of one of the workstations. One embodiment of an operational method of computer system 510 and automatic switching device 330 is discussed below in greater detail in reference to FIG. 6.

Computer system 510 utilizes well known virtual addressing mechanisms that allow the programs of computer system 510 to behave as if they only have access to a large, single storage entity instead of access to multiple, smaller storage entities such as main memory 520 and DASD device 555. Therefore, while data 521, operating system 522, mouse monitoring mechanism 523, boundary condition analyzer 524, switch command 525 and other system components 526 are shown to reside in main memory 520, those skilled in the art will recognize that these items are not necessarily all completely contained in main memory 520 at the same time. It should also be noted that the term "memory" is used herein to generically refer to the entire virtual memory of computer system 510, and may include the virtual memory of other computer systems coupled to computer system 510.

Processor 515 may be constructed from one or more microprocessors and/or integrated circuits. Processor 515 executes program instructions stored in main memory 520. Main memory 520 stores programs and data that processor 515 may access. When computer system 510 starts up, processor 515 initially executes the program instructions that make up operating system 522. Operating system 522 is a sophisticated program that manages the resources of computer system 510. Some of these resources are processor 515, main memory 520, mass storage interface 530, display interface 540, mouse/keyboard interface 580, network interface 550, and system bus 560.

Although computer system 510 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 515. However, those skilled in the art will appreciate that the present invention applies equally to computer systems that simply use I/O adapters to perform similar functions.

Display interface 540 is used to directly connect one or more displays 516 to computer system 510. These displays 516, which may be non-intelligent (i.e., dumb) terminals or fully programmable workstations, are used to allow system administrators and users to communicate with computer system 510. Although display 516 is specifically shown in this example as being connected to computer system 510 (e.g., display 322 connected to workstation 320, and display 342 connected to workstation 340 in FIG. 3), it is also to be understood that one or more displays may also be connected to automatic switching device 330 as will be discussed in reference to FIG. 7.

Network interface 550 is used to connect other computer systems and/or workstations 575 to computer system 510 across a network 570. The present invention applies equally no matter how computer system 510 may be connected to other computer systems and/or workstations, regardless of whether the network connection 570 is made using present-day analog and/or digital techniques or via some networking mechanism of the future. In addition, many different network protocols can be used to implement a network. These protocols are specialized computer programs that allow computers to communicate across network 570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., CD RW 595), and transmission type media such as digital and analog communications links.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 6:
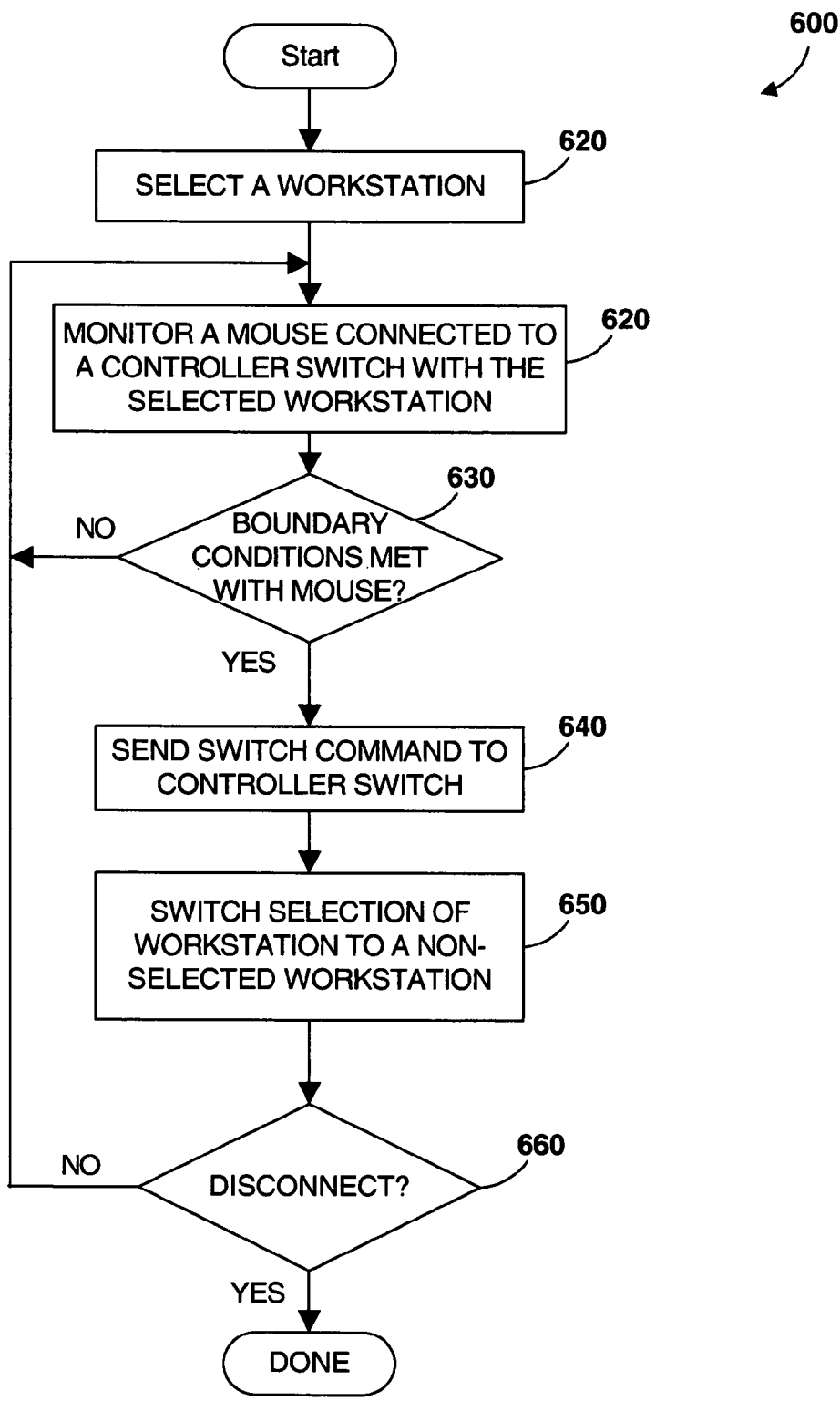
FIG. 6 is a flow diagram of a method in accordance with the preferred embodiments.

The preferred embodiments provide a significant advance in the art by providing a method to automatically switch signals of input devices between multiple workstations with the movement of a mouse across two displays. Referring to FIG. 6, a method 600 in accordance with the preferred embodiments is a method for automatically switching output signals of input devices between two workstations. Method 600 is preferably performed by automatic switching device 330 with mouse 128 connected thereto, workstation 320 and workstation 340 of FIG. 3, each workstation having the configuration of computer system 510 of FIG. 5. It is important to note that workstation 320 and workstation 340 may be comprised of different operating systems, or may be similar operating systems and the present invention is not limited to one or the other. The first step is to select a workstation (i.e., workstation 320) (step 610). In this specific example, controller switch 305 of automatic switching device 330 first selects output port 307, which is connected to workstation 320, thus selecting workstation 320. The selection of workstation 320 results in the automatic switching device 330 routing the output signals from mouse 128 to workstation 320. The movement of mouse 128 on display 322 is monitored with mouse monitoring mechanism 523 of workstation 320 (step 620). The boundary condition analyzer 524 of workstation 320 then analyzes if boundary conditions are met with mouse 128 (step 630). If the boundary conditions are not met (step 630=NO), method 600 loops back to step 620.

If the boundary conditions are met (step 630=YES) a switch command 525 from the selected workstation 320 is sent to controller switch 305 of automatic switching device 330 (step 640). As aforementioned, boundary conditions include the predetermined conditions of the movement of mouse 128, such as moving a predetermined amount off of the right edge of display 322, or moving a predetermined amount off of the left edge of display 342 (when workstation 340 is selected). Boundary conditions are also met if a disconnect occurs, such as power being turned off to any of the workstations or automatic switching device or one or both of the workstations are disconnected from the automatic switching device. Of course, there are many other ways to define boundary conditions. For example, a boundary condition for switching the automatic switching mechanism may be defined by moving the mouse off the top of the screen, then left past the left boundary. This more complex boundary condition could prevent inadvertently switching by defining two or more mouse movements that must be done in the proper sequence before switching will occur. In addition, the preferred embodiments extend to a keystroke sequence defining a boundary condition that causes a switch to occur. For example, pressing the three keyboard keys <Ctrl><Alt> and S simultaneously could be defined as a boundary condition that causes the automatic switching device 330 to automatically change state.

Controller switch 305 then switches the output signals from input port 306 to the non-selected output port 308, and thus the non-selected workstation (in this case, workstation 340) (step 650). If a disconnect does not occur (step 660=NO), method 600 then loops back to step 620 wherein workstation 340 is the selected workstation and workstation 320 becomes the non-selected workstation. The mouse is then monitored on display 342 with mouse monitoring mechanism 523 of workstation 340 until conditions are met to switch the output signals of input port 306 back to the first workstation. Method 600 is done when a disconnect occurs (e.g., one or both of the workstations are disconnected from the automatic switching device, or if any workstations or automatic switching device are turned off) (step 660=YES).

Figure 7:
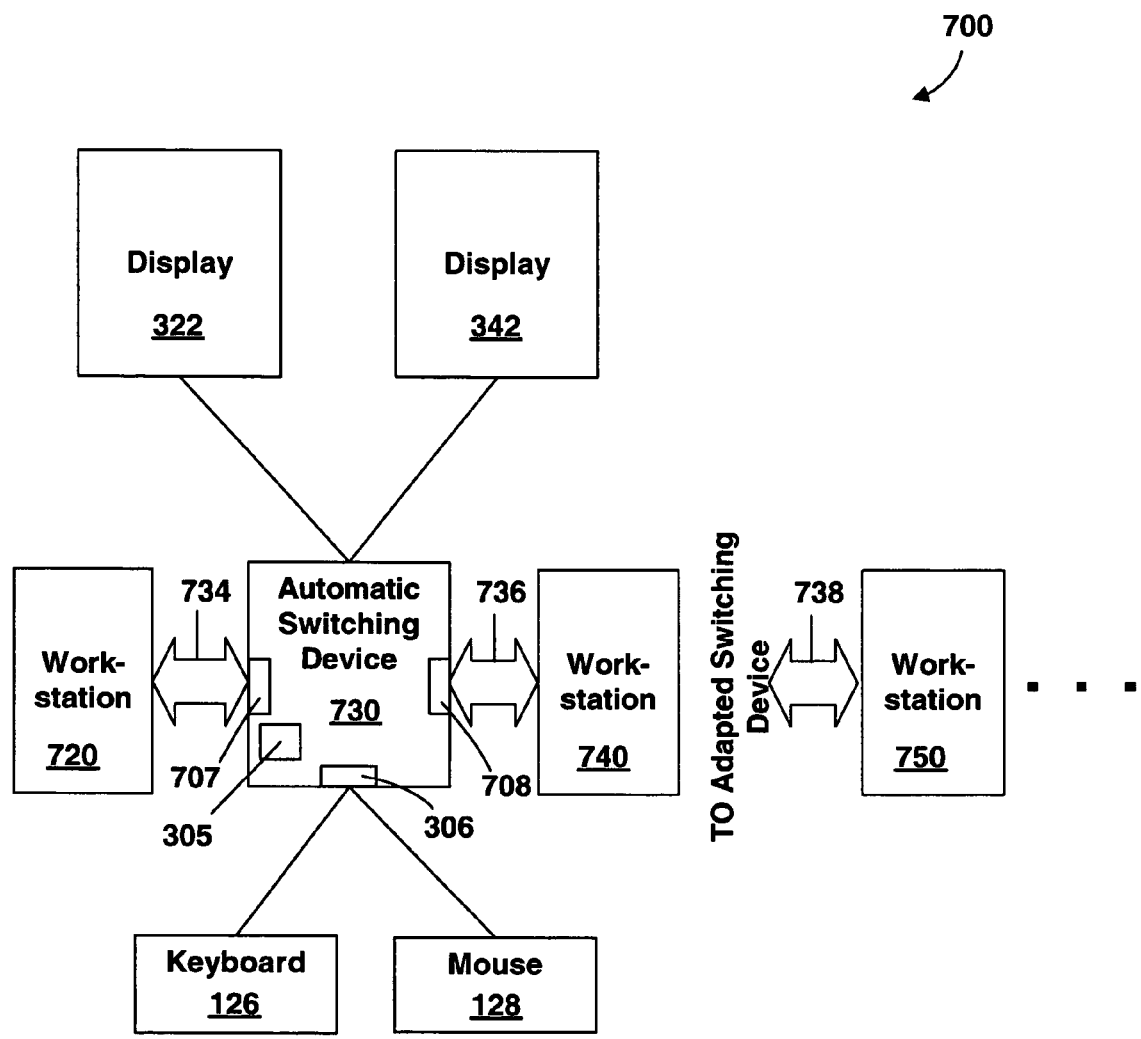
FIG. 7 is a block diagram of another example of a switching device in a multiple workstation system in accordance with the preferred embodiments.

As seen in FIG. 7, the present invention also provides a second example of a multiple workstation system 700 wherein automatic switching device 730 may switch output signals of input devices between more than two workstations. In this example, display 322 and display 342 are connected to automatic switching device 730 along with keyboard 126 and mouse 128. Automatic switching device 730 with controller switch 305 connects to multiple workstations (i.e., workstation 720, workstation 740, workstation 750, etc.) through communication lines 734, 736, 738, and any other communication lines that are not shown but are needed for connections. Although workstation 720, workstation 740 and workstation 750 are specifically shown, other workstations may be connected to automatic switching device 730 and the present invention is not limited by such. As with automatic switching device 330 (FIG. 3), automatic switching device 730 connects to the multiple workstations through multiple output ports (such as output port 707, output port 708 and other output ports corresponding to other workstations that are not shown). Also, as with the previous examples, computer system 510 (FIG. 5) is one suitable implementation of each of the workstations. It is important to note that workstation 720, workstation 740 and workstation 750, etc. may be comprised of different or similar operating systems, and the present invention is not limited to one or the other.

Communication lines 734, 736, and 738 are preferably hardwired to provide security between the workstations and automatic switching device 730. Communication lines 734, 736, and 738 may consist of PS/2 cables, USB cables, or any other appropriate cables that will communicate with input port 306 and input devices 126 and 128. Display 322 and display 342 allow data from any two workstations to be visible at all times.

Since in this example there are only two displays and more than two workstations, the data from each workstation is viewed on display 322 or display 342 in a predetermined sequence. For example, when output port 707 corresponding to workstation 720 is selected, data from workstation 720 is viewed on display 322 and data from workstation 740 is viewed on display 342. Mouse 128 and keyboard 126 are utilized with workstation 720 and display 322. When the movement of mouse 128 is a predetermined amount off the right edge of display 322, output signals from input port 306 are automatically switched from output port 707 to output port 708 corresponding to workstation 740, and mouse 128, keyboard 126 and display 342 are utilized with workstation 740. When the movement of mouse 128 is a predetermined amount off the right edge of display 342, then output signals from input port 306 are automatically switched from output port 708 to the output port (not shown) corresponding to workstation 750, and display 322 will now view the data from workstation 740 and display 342 will view the data from workstation 750. To switch the output signals from input port 306 back to workstation 720, the mouse 128 moves a predetermined amount off the left edge of display 342 and then off the left edge of display 322. This sequence may continue for all the workstations in multiple workstation system 700. Although this specific sequence is disclosed, other sequences may also be used, such as the movement of mouse off the top or bottom of a display, to switch input devices to a workstation, and the present invention is not limited to such. In operation, controller switch 305 switches the output signal from input port 306 to a non-selected output port similar to the method described in reference to FIG. 4, except instead of two output ports, there are multiple output ports, wherein the sequence to switch output ports is predetermined as discussed above.

The preferred embodiments provide a significant improvement over the prior art, wherein the user had to manually switch the output signals of input devices between the workstations and only one display of data from a single workstation would be shown at a time. Furthermore, the disadvantages of connecting to a non-secure site LAN, also discussed in reference to the prior art, are resolved through the present invention. For example, because communication lines are hardwired between the workstations and the automatic switching device in the present invention, the connections are secure, knowledge of computer networking is not necessary, and clear text, unencrypted data (such as passwords) are not exposed on the site LAN.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, it is within the scope of the preferred embodiments to switch between other types of devices, such as audio input/output devices, when they are connected to the automatic switching device of the present invention.

What is claimed is:

1. A switching device comprising:
   an input port configured to receive output signals from a keyboard and a mouse;
   a first output port coupled through a hardwired cable to a first keyboard port and a first mouse port on a first computer workstation, the first computer workstation comprising:
      a first mouse monitoring mechanism for monitoring the first mouse port; and
      a first boundary condition analyzer for analyzing and indicating when movement of the mouse on the first mouse port meets first predetermined boundary conditions, and in response to the movement of the mouse on the first mouse port meeting the first predetermined boundary conditions, sending a first switch command signal;
   a second output port coupled through a hardwired cable to a second keyboard port and a second mouse port on a second computer workstation, the second computer workstation comprising:
      a second mouse monitoring mechanism for monitoring the second mouse port; and
      a second boundary condition analyzer for analyzing and indicating when movement of the mouse on the second mouse port meets second predetermined boundary conditions, and in response to the movement of the mouse on the second mouse port meeting the second predetermined boundary conditions, sending a second switch command signal;
   a third output port coupled through a hardwired cable to a third keyboard port and a third mouse port on a third computer workstation, the third computer workstation comprising:
      a third mouse monitoring mechanism for monitoring the third mouse port; and
      a third boundary condition analyzer for analyzing and indicating when movement of the mouse on the third mouse port meets third predetermined boundary conditions, and in response to the movement of the mouse on the third mouse port meeting the third predetermined boundary conditions, sending a third switch command signal;
   a first output display port coupled to a first display;
   a second output display port coupled to a second display;
   a controller switch that automatically routes the output signals at the input port to the first output port when the controller switch is in a first state, the controller switch automatically routing the output signals at the input port to the second output port when the controller switch is in a second state, the controller switch automatically routing the output signals at the input port to the third output port when the controller switch is in a third state, wherein the controller switch changes between the first, second and third states when the first, second and third switch command signals are received by the controller switch via at least one of the first, second and third output ports, the controller switch routing display signals from two of the first, second and third computer workstations to the first and second output display ports in a predetermined sequence, the controller switch routing display signals from the first computer workstation to the first output display port and routing display signals from the second computer workstation to the second output display port, and in response to receiving the second switch command signal, the controller switch routes display signals from the second computer workstation to the first output display port and routes display signals from the third computer workstation to the second output display port, and in response to the third switch command signal, the controller switch routes display signals from the third computer workstation to the first output display port and routes display signals from the first computer workstation to the second output display port.

2. The switching device of claim 1 wherein at least one of the first, second and third predetermined boundary conditions comprises movement of the mouse off an edge of a display coupled to one of the first and second output display ports.

3. A method for using a plurality of computer workstations, the method comprising the steps of:
   (A) routing output signals of a keyboard and a mouse from an input port of a switching device to a first of multiple ports of the switching device when the switching device is in a first state, the first output port coupled to a first keyboard port and a first mouse port on a first of the plurality of computer workstations;
   (B) routing the output signals of the keyboard and mouse from the input port to a second of the multiple output ports when the switching device is in a second state, the second output port coupled to a second keyboard port and a second mouse port on a second of the plurality of computer workstations;
   (C) routing the output signals of the keyboard and mouse from the input port to a third of the multiple output ports when the switching device is in a third state, the third output port coupled to a third keyboard port and a third mouse port on a third of the plurality of computer workstations; and
   (D) automatically switching between the first, second and third states when one of a first or second switch command signals is received from the corresponding first, second or third computer workstation;
   (E) routing display signals from two of the first, second and third computer workstations to a first and second displays in a predetermined sequence, the routing display signals comprising the steps of:
      routing display signals from the first computer workstation to the first display and routing display signals from the second computer workstation to the second display when the switching device is in the first state;
      determining when movement of the mouse satisfies first predetermined boundary conditions, and in response thereto, sending the first switch command signal;
      in response to receiving the first switch command signal, routing display signals from the second computer workstation to the first display and routing display signals from the third computer workstation to the second display;

determining when movement of the mouse satisfies second predetermined boundary conditions, and in response thereto, sending the second switch command signal; and in response to receiving the second switch command signal, routing display signals from the third computer workstation to the first display and routing display signals from the first computer workstation to the second display.

4. The method of claim 3 wherein at least one of the first and second predetermined boundary conditions is movement of the mouse off the edge of one of the first and second displays.

5. A system comprising:
a mouse;
a first computer workstation comprising:
   a first mouse monitoring mechanism for monitoring movement of the mouse; and
   a first boundary condition analyzer for analyzing and indicating when first predetermined boundary conditions are met with movement of the mouse, and in response to the movement of the mouse meeting the first predetermined boundary conditions, sending a first switch command signal;
a second computer workstation comprising:
   a second mouse monitoring mechanism for monitoring movement of the mouse; and
   a second boundary condition analyzer for analyzing and indicating when second predetermined boundary conditions are met with movement of the mouse, and in response to the movement of the mouse meeting the second predetermined boundary conditions, sending a second switch command signal;
a third computer workstation comprising:
   a third mouse monitoring mechanism for monitoring movement of the mouse; and
   a third boundary condition analyzer for analyzing and indicating when third predetermined boundary conditions are met with movement of the mouse, and in response to the movement of the mouse meeting the third predetermined boundary conditions, sending a third switch command signal;
a first output display port;
a second output display port; and
a switching device comprising:
   an input port connected to the mouse, the input port receiving output signals from the mouse;
   a plurality of output ports, each output port coupled to mouse input ports of the first, second and third computer workstations; and
   a controller switch for automatically switching the output signals between the plurality of output ports when one of a first, second, or third switch command signals is received by the controller switch from a corresponding one of the first, second or third computer workstations, the controller switch routing display signals from two of the first, second and third computer workstations to the first and second output display ports in a predetermined sequence, the controller switch routing display signals from the first computer workstation to the first output display port and routing display signals from the second computer workstation to the second output display port, and in response to receiving the second switch command signal, the controller switch routes display signals from the second computer workstation to the first output display port and routes display signals from the third computer workstation to the second output display port, and in response to the third switch command signal, the controller switch routes display signals from the third computer workstation to the first output display port and routes display signals from the first computer workstation to the second output display port.

6. The system of claim 5 wherein at least one of the first, second and third predetermined boundary conditions is movement of the mouse off an edge of a display coupled to one of the first and second output display ports.

* * * * *